Nov. 8, 1927.  
L. WYANT  
1,648,527
RAILWAY SIGNAL
Filed Nov. 23, 1926
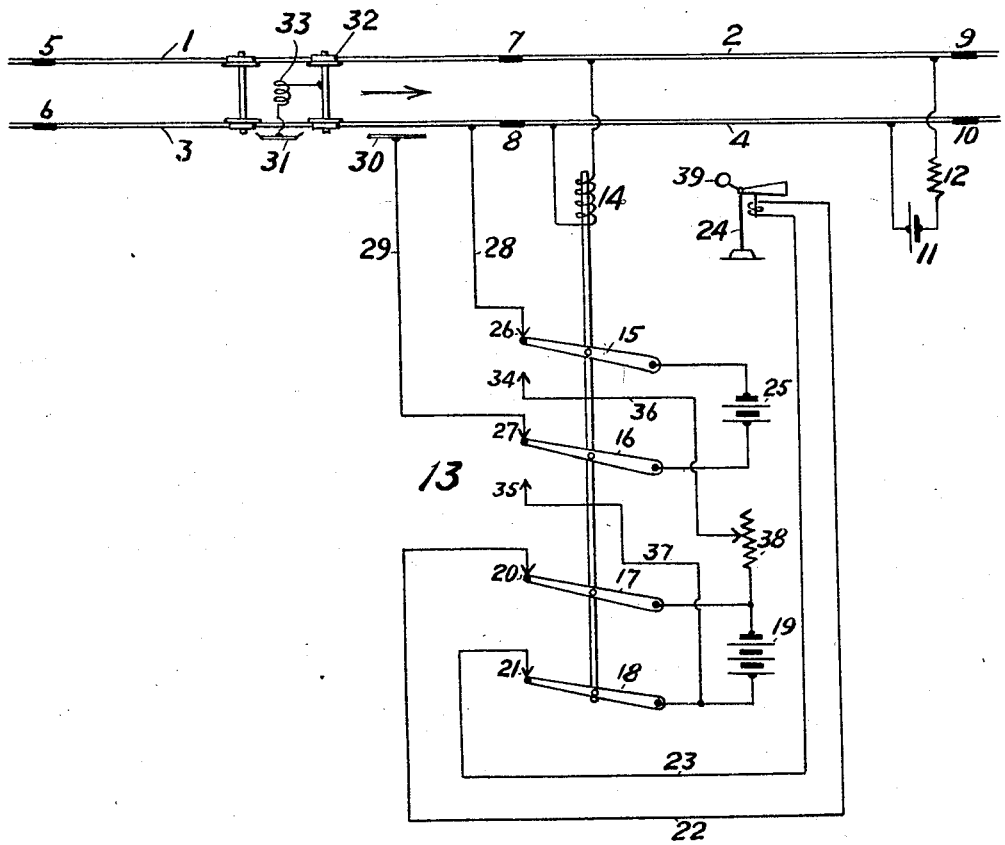
WITNESS:
INVENTOR  
Leroy Wyant  
BY  
Augustus B Stoughton  
ATTORNEY.

Patented Nov. 8, 1927.

1,648,527

UNITED STATES PATENT OFFICE.

LEROY WYANT, OF CHICAGO, ILLINOIS.

RAILWAY SIGNAL.

Application filed November 23, 1926. Serial No. 150,191.

The principal objects of the present invention are to provide for connecting a battery, grounded at one end through a train signal circuit, with the circuit of a wayside signal operating source only when the latter is disconnected from the wayside signal circuit; and to utilize existing equipment in the operation of train and wayside signal apparatus in such a way that a single relay apparatus can be employed to properly and reliably control the circuit of both the train and wayside signal apparatus.

The invention will be claimed at the end hereof but will be first described in connection with the accompanying drawing in which the single figure diagrammatically and schematically illustrates a signal system embodying features of the invention.

In the accompanying diagram, 1, 2, 3 and 4 represent the sections of a railway track insulated from each other by insulating joints 5, 6, 7, 8, 9 and 10. At one end of the track section 2, 4 is shown a track battery 11 connected across the opposite rails through a fixed resistance 12.

At the opposite end of this track section is shown a track relay generally indicated at 13, and whose operating coil 14 is connected across the opposite rails 2, 4 and thus receives current from the track battery 11. Thus current in the coil 14 holds the contact arms 15, 16, 17 and 18 of the relay in the position shown in the drawing. A signal operating battery 19 is connected to the arms 17 and 18, and these arms in the position shown make contact with the contact points 20, 21, thereby furnishing current by way of conductors 22 and 23 for operating the wayside signal 24.

Another battery 25 is shown connected to the arms 15 and 16 of the relay 13, and in the position shown, these arms make contact with the contact points 26 and 27, connected by means of conductors 28 and 29, respectively, to the rail 3 and the ramp 30. The latter is arranged in proximity to the rail 3, so that the contact shoe 31 carried by the pony truck of the locomotive 32 will make electrical contact with the ramp 30, as the train passes over the section.

The contact shoe 31 is connected with any suitable signaling or control apparatus in the cab of the locomotive, this apparatus being indicated by the coil 33, the circuit being completed through one of the axles of the locomotive wheels to the track. Any of the well known means for operating signals or train control apparatus on the locomotive may be employed and the details of this part of the apparatus are not here shown, as they constitute no part of this invention.

The arms 15 and 16 of the relay 13 are provided with back contacts 34 and 35, whereby when the contact arms drop, breaking the circuit between the battery 25 and the conductors 28 and 29, a circuit is established from the battery 25 by way of conductors 36 and 37 to the terminals of battery 19, this circuit including an adjustable resistance 38. The relative number of cells in batteries 25 and 19 is so chosen that when the battery 25 is thus connected to the battery 19, a small amount of charging current will pass from the battery 19 to the battery 25, sufficient to make up for the momentary discharges to which the battery 25 may be subjected in service, and thus keep the latter fully charged. The battery 19 may be of the primary type, which is kept in service until its elements are exhausted and the latter are then renewed or it may be of the storage type, in which case when it becomes exhausted, it may be replaced by a fully charged battery or means may be provided for keeping it charged without removing it from the signal location. These various methods of keeping the battery 19 in condition for service are well known and need not be further described herein.

The method of operation of the battery described above is as follows:

When a train enters the block represented by the rails 2, 4, its wheels and axles constitute a short circuit across these rails, which reduces the voltage across the relay coil 14 to a point permitting the arms of this relay to drop. The contacts at points 20 and 21 will thereby be opened, releasing the arm of signal 24, which by reason of the counterpoise 39 will be raised to the "stop" position.

The arms 15 and 16 will drop from their contact with contact points 26 and 27 and make contact with the points 34 and 35. This will open the circuit leading from the battery at 25 to the ramp 30 and the rail 3, so that when the truck of a following train represented at 32 passes this ramp, it will fail to get the usual electrical impulse from battery 25 via the shoe 31, thus indicating to the engineer by means of suitable cab signals that the block ahead is occupied. The arms 15 and 16 now being in contact with contact points 34 and 35, current will pass from battery 19 via these contact points to battery 25 in the direction to charge the latter, and this condition will be maintained so long as there is a train in the block 2, 4.

Whenever a train passes through the block 1, 3 with the block ahead unoccupied, the relay 13 will be in the position shown in the drawing, and as the contact shoe 31 passes over the ramp 30, the battery 25 will discharge momentarily through the signaling circuit 33. The same train, however, will immediately enter the block 2, 4, causing the arms of the relay 13 to drop, thereby permitting the battery 25, to be charged from the battery 19. Thus every discharge of the battery 25 will be followed by a charge, and by properly adjusting the value of resistance 38, the amount of this charge may be sufficient to keep the battery fully charged.

It will be observed that the battery 25 when connected to the ramp 30 and the rail 3 is grounded at one end. It would be undesirable to connect a grounded battery to the circuit of the signal operating battery 19, especially when the latter is connected to the signal circuit 22 and 23. However, it will be seen from the above description that when the battery 25 is connected to the battery 19, it is disconnected from the grounded circuit; also, the signal circuit 22, 23 is disconnected at that time from the battery 19. This arrangement, therefore, avoids any possibility of trouble, due to grounding the circuit of battery 19 while charging the battery 25.

It will be obvious to those skilled in the art that modifications may be in details of construction and arrangement without departing from the spirit of the invention which is not limited to such matters or to matters of mere form, or otherwise than the appended claims and the prior art may require.

I claim:

1. In combination in a railway signaling system employing wayside signals and electrically operated apparatus on the train, an electric circuit for controlling the apparatus on the train, said circuit including a portion of the track and a storage battery, a stationary wayside contact and a moving contact on the train adapted to coact therewith, a wayside signal, a source of current and its circuit connections for operating said wayside signal, and a track relay responsive to train movements over the track and adapted to make and break the circuit from the source to the wayside signal and simultaneously to break and make respectively the connection from the source to the storage battery, whereby the said source charges the battery only when disconnected from the wayside signal.

2. In a railway signaling system including a track and a train; the combination of electrically operated signal apparatus on the train; an electric circuit for controlling the apparatus on the train including a portion of the track and a storage battery; a wayside signal, a source of current having circuit connections for operating said wayside signal; a connection from the source to the battery, and relay contractors responsive to train movements over the track and adapted to make and break the circuit from the source to the wayside signal and simultaneously to break and make respectively the connection from the source to the storage battery, whereby the source charges the battery only when the source is disconnected from the wayside signal operating circuit.

3. In a railway signaling system the combination of a track divided into sections, a train, a train signal, a wayside signal, a source of current, a storage battery, a contactor relay responsive to train movements on the sections of the track and adapted to occupy two positions; and circuit connections controlled by the relay contactors and adapted in one position thereof to connect the source with the wayside signal and the battery with the train signal through ground and to disconnect the battery from source, and adapted in the other position thereof to disconnect the source and wayside signal and the battery and train signal and to connect the battery with the source in charging relation.

LEROY WYANT.